Oct. 31, 1967   C. J. WALKER   3,349,512
INTERCHANGEABLE ROD AND REEL CARRIER APPARATUS
Filed May 14, 1965   2 Sheets-Sheet 2

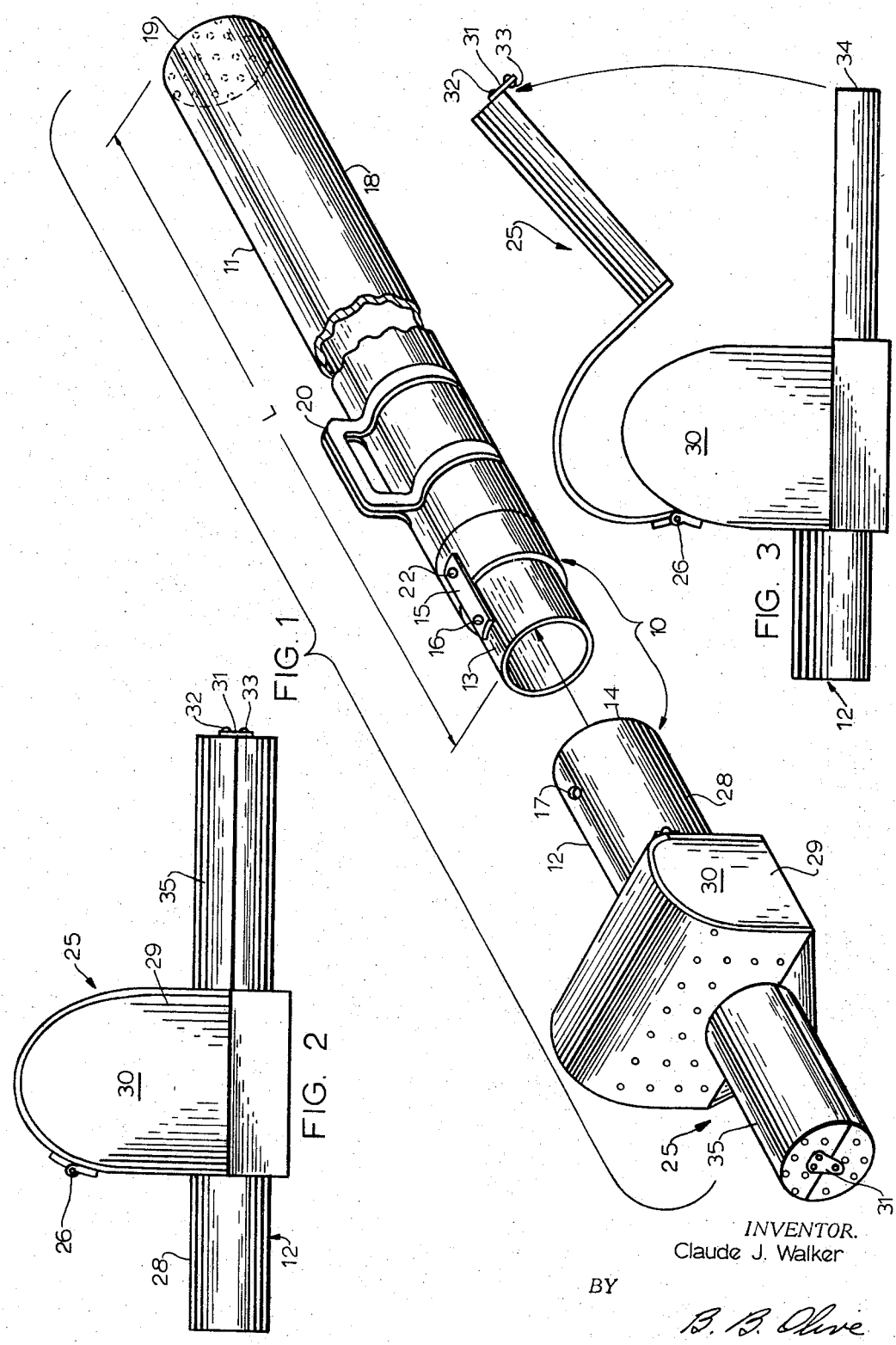

INVENTOR.
Claude J. Walker
BY
B. B. Olive
ATTORNEY

United States Patent Office 3,349,512
Patented Oct. 31, 1967

3,349,512
INTERCHANGEABLE ROD AND REEL
CARRIER APPARATUS
Claude J. Walker, Rte. 2, Hillsborough, N.C. 27278
Filed May 14, 1965, Ser. No. 455,713
3 Claims. (Cl. 43—26)

This invention relates to a fisherman's case for a rod and reel set and, more particularly to interchangeable rod and reel housings for receiving different rod lengths and the various shapes of reels.

Rod and reel cases now available and which constitute the prior art show that it is old to encase a reel mounted on a rod in an integral and rigid, tubular structure. Traveling cases of this type are designed for a particular rod and reel like a side mounted fly rod, a level wind reel on a casting rod, etc. The inherent disadvantage of a rod and reel case of this nature is that it is useful for housing only one type of reel which is mounted on a rod of a predetermined length. In addition, the art teaches a telescoping tube which can receive rods of various lengths.

It can be seen that the art does not teach a composite rod and reel case or carrier having interchangeable housings for receiving rods of various lengths and reels of different sizes. This invention provides, for example, a convenient storage and transportation case for fly rods, bait casting rods and spinning rods along with their respective reels. They may be stored in the case while the line remains intact thereon. A minimum of time and effort is involved in removing the rod and reel from or placing the rod and reel in the case. Also, the case as described herein is relatively inexpensive to manufacture and can be made from most any rust resisting, light material such as aluminum, alloy steel, plastic, and the like.

An object of this invention is to provide sets of interchangeable rod and reel cases which are adapted to receive a variety of rods and reels of different character.

Another object of this invention is to provide a separable rod and reel carrier which receives a composite rod and reel.

A still further object is to provide a rod and reel case which is air permeable thus preventing the warping and twisting of the rods.

Yet another object of this invention is to provide a rod and reel case which will protect the enclosed rod and reel and which may be economically manufactured.

These and other objects will become more apparent from the following detailed description and accompanying drawings which illustrate and describe the preferred embodiments of the invention:

FIGURE 1 is a perspective, exploded view of the case showing the rod-receiving portion being positioned to be mated with the reel receiving portion.

FIGURE 2 is an elevation view of the reel-receiving portion of the case shown in FIGURE 1.

FIGURE 3 is an elevation view of the reel-receiving portion of the case shown in FIGURE 2 but taken from the opposite side and showing the cover being pivoted into a raised position for allowing the rod and reel to be inserted in the case.

Figure 4:
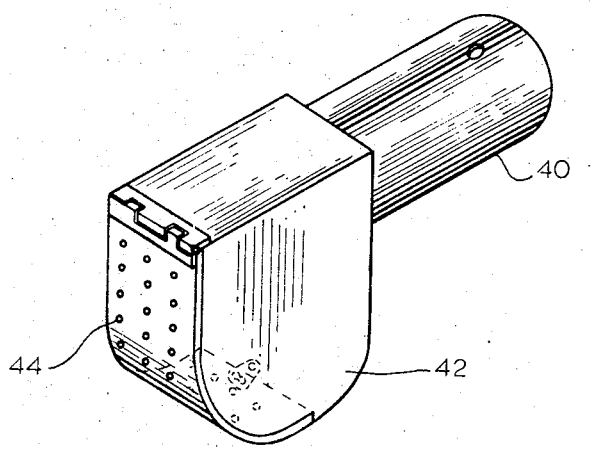
FIGURE 4 is a perspective view of a reel case shaped to receive a bottom mounted fly reel and adapted to mount on the rod receiving portion shown in FIGURE 1.

In general, the present invention provides a substantially rigid, compact carrying case for a composite rod, reel, line and perhaps lure. Each case is provided with a rod section and a reel section. The dominant feature of the invention is that it includes a plurality of interchangeable reel case sections and rod case sections which are adapted to receive a particular rod and reel set. By providing a rod and reel case with interchangeable sections, the case may be quickly converted from a side mounted fly reel case to a bottom mounted fly reel case by changing only the reel casing. Likewise, the rod section of the case may be substituted for another where a change in length necessitates the same. The rod section is tubular in design and has a handle, a perforated substantially closed end and an open end adapted to be received by and be locked into position in the reel section. The reel section is comprised of a reel housing and a tube portion being integral therewith and extending therefrom for matingly receiving a portion of the rod section. A selected area of this section is perforated which allows air to penetrate the casing and dry the line. A hinged door which constitutes a part of the reel housing is pivotally mounted on the casing and is provided with a latch for locking the same in a closed position. When the door is open, a composite rod and reel may be easily inserted in the case.

Referring more particularly to the drawings, a rod and reel case 10 which is substantially tubular in design is provided with a rod section 11 and a reel section 12. These two sections of the invention form a composite case by extending the rod section to form an annular flange 13 which has an outer diameter of less distance than the inner diameter of its mating portion 14 of reel section 12. The two sections are joined by journaling flange 13 in portion 14 and locking the same into position by spring lock 15.

Spring lock 15 is rigidly attached to either the reel section 12 or the rod section 11 (the rod section in FIGURE 1) by screws 22, rivets or the like, and has a stake 16 which is securely mounted in the free end. Stake 16 locks one section of the casing 10 to the other when it is received by a matching indentation or hole 17 in reel casing 12. It is obvious that the flange, mating portion and locking means may be switched from its position on one case section to a relative position on the other.

The rod section 11 is provided with a tube 18 which may be of any length L although it is preferable to use shorter tubes with shorter rods. The circular end 19 completing the closure is perforated so as to permit a drying air to pass therethrough. Rod section 11 is also provided with a handle 20 which is placed along the tube in a position to balance rod and reel case 10 when suspended therefrom in a horizontal position.

Figure 5:
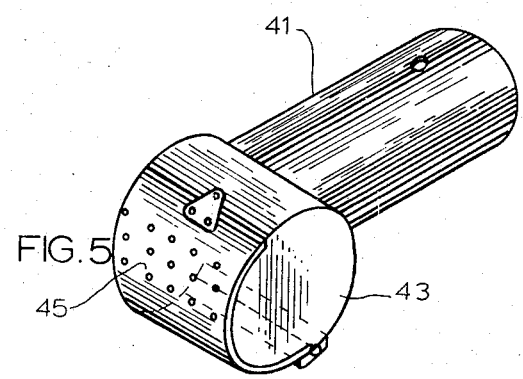
FIGURE 5 is a perspective view of a reel case shaped to receive a side mounted fly reel and which is also adapted to mount on the rod receiving portion shown in FIGURE 1.
Figure 6:
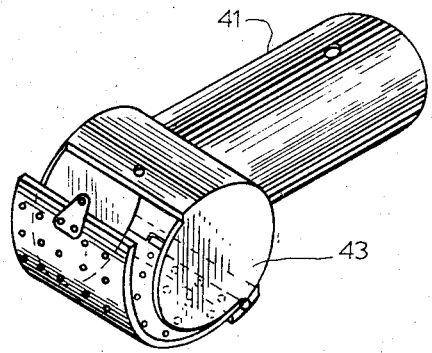
FIGURE 6 is a perspective view of the reel case shown in FIGURE 5 and showing the housing door in a partially open position.

Reel section 12 of rod and reel case 10 may be of most any design and rod section 11 may be of most any length thereby adapting the device as a whole to accommodate any kind of rod-reel set which the fisherman may have (samples of the various types of casings are shown in FIGURES 4, 5 and 6). However, all of the disclosed reel sections have several things in common. Each reel section is adapted to receive flange 13 of the rod section 11 to form the composite rod-reel case 10 and each reel section has a door which is pivotally mounted on the reel section by a hinge to receive the rod-reel set being stored. For example, in FIGURE 1, door 25 mounts on section 12 by means of hinge 26. When assembled, tube 28 of reel section 12 houses mating portion 14 thereof and a length of the rod (not shown). Reel housing 29 encloses a reel (not shown) and is comprised of sides 30 and door 25. Door 25 is provided with a latch 31 which is rigidly mounted thereon by rivets, screws or the like 32. Latch 31 locks door 25 to reel section 12 when a stake 33 is received by a hole or indentation at 34 in reel section 12.

It is imperative to understand that the reel section 12 may be of any shape and may have elements that the others do not have such as the extension 35 in FIGURE 1. This element 35, for example, is not found on reel casings 42 and 43 as shown in FIGURES 4, 5 and 6 since the rod handle employed with casings such as 42, 43 is integral with the forward part of the rod. It protects and houses a handle to a rod as shown in FIGURES 1, 2 and 3. Tube 28 extending from reel housing 29 (FIGURE 1), tube 40 extending from reel housing 42 (FIGURE 4) and tube 41 extending from reel housing 43 (FIGURE 5) are all geometrically shaped to be interchangeably mounted on flange 13. Door 44 and door 45 function essentially in the same way as door 25 (FIGURE 1).

Having described my invention, I claim:

1. A composite rod and reel carrier comprising a rigid elongated hollow tube having one end substantially closed and one end open; a handle mounted for carrying said tube horizontally; and a rigid hollow case having a door opening in the wall thereof and including a hollow tubular portion mating with and detachably secured to said tube open end, said case being shaped to receive through said door opening an interconnected rod-reel set of given configuration for storing the rod portion in said tube and the reel portion in said case thereby providing an integral rigid protective structure for transporting said set of said configuration.

2. Apparatus for making up composite rod and reel carriers comprising a rigid elongated hollow tube having one end substantially closed and one end open; a handle mounted for carrying said tube horizontally; and a plurality of rigid hollow cases each having a door opening in the wall thereof, a hollow tubular portion extending therefrom and detachably securable to said tube open end and an interior shape conforming to a reel of the same general configuration, a selected case when secured to said tube being adapted to receive through the door opening thereof an interconnected rod-reel set of a conforming configuration for storing the rod portion in said tube and the reel portion in said selected case thereby providing an integral rigid protective structure for transporting said set while maintaining the interchangeability of said tube with each of the other of said cases for storing and transporting sets of other configuration.

3. Apparatus for making up composite rod and reel carriers comprising a plurality of rigid elongated hollow tubes of different lengths conforming to rods of different length, each tube having one end substantially closed, one end open and of a common shape and including a handle for carrying the tube horizontally; and a plurality of rigid hollow cases each having a door opening in the wall thereof, a hollow tubular portion extending therefrom and shaped to conform to said common shape of the open ends of said tubes such that any of said cases may be detachably secured to any of said tubes, each of said cases having an interior shape conforming to a reel of the same general configuration, a selected one of said cases when secured to a selected one of said tubes being adapted to receive through the door opening thereof an interconnected rod-reel set of a conforming configuration for storing the rod portion thereof in said selected tube and the reel portion thereof in said selected case thereby providing an integral rigid protective structure for transporting said set while maintaining the interchangeability of each of said tubes with each of said cases.

References Cited

UNITED STATES PATENTS

| 2,143,720 | 1/1939 | Smith | 43—26 X |
| 2,149,087 | 2/1939 | Fisher | 43—26 |
| 2,591,674 | 4/1952 | Chalker | 43—26 X |
| 2,902,790 | 9/1959 | Harvey | 43—26 |
| 2,919,017 | 12/1959 | Weber | 220—8 X |

FOREIGN PATENTS

| 23,710 | 1912 | Great Britain. |

SAMUEL KOREN, *Primary Examiner.*

WARNER H. CAMP, *Examiner.*